(12) United States Patent
Matsushita

(10) Patent No.: US 9,389,361 B2
(45) Date of Patent: Jul. 12, 2016

(54) METHOD AND APPARATUS FOR MANUFACTURING OPTICAL FIBER

(71) Applicant: FUJIKURA LTD., Koto-ku, Tokyo (JP)

(72) Inventor: Shingo Matsushita, Sakura (JP)

(73) Assignee: FUJIKURA LTD., Tokyo (JP)

( * ) Notice: Subject to any disclaimer, the term of this patent is extended or adjusted under 35 U.S.C. 154(b) by 206 days.

(21) Appl. No.: 13/903,542

(22) Filed: May 28, 2013

(65) Prior Publication Data

US 2013/0255323 A1 Oct. 3, 2013

Related U.S. Application Data

(63) Continuation of application No. PCT/JP2012/070620, filed on Aug. 13, 2012.

(30) Foreign Application Priority Data

Aug. 12, 2011 (JP) ................................. 2011-176740

(51) Int. Cl.
*C03B 37/025* (2006.01)
*G02B 6/02* (2006.01)
*C03B 37/027* (2006.01)

(52) U.S. Cl.
CPC ...... *G02B 6/02395* (2013.01); *C03B 37/02718* (2013.01); *C03B 37/02727* (2013.01); *C03B 2203/24* (2013.01)

(58) Field of Classification Search
CPC .................... C03B 37/02718; C03B 37/02727
See application file for complete search history.

(56) References Cited

U.S. PATENT DOCUMENTS

| 4,304,582 | A | * | 12/1981 | Aussenegg | ............... C03B 37/15 |
| | | | | | 65/488 |
| 4,874,415 | A | * | 10/1989 | Boniort et al. | ................... 65/432 |
| 6,715,323 | B1 | * | 4/2004 | Roba et al. | ....................... 65/434 |

(Continued)

FOREIGN PATENT DOCUMENTS

| CN | 1882513 A | 12/2006 |
| EP | 1 728 769 A | 12/2006 |
| JP | 01-301531 A | 12/1989 |
| JP | 2003-176149 A | 6/2003 |
| JP | 2011-102964 A | 5/2011 |

OTHER PUBLICATIONS

International Search Report of PCT/JP2012/070620 dated Nov. 20, 2012.

(Continued)

*Primary Examiner* — Lisa Herring
(74) *Attorney, Agent, or Firm* — Sughrue Mion, PLLC

(57) ABSTRACT

Provided is a method for manufacturing an optical fiber. The method includes the steps of: heating and melting a silica-based optical fiber preform in a drawing furnace; drawing the melted preform into a linear shape from the drawing furnace, continuously cooling and solidifying the preform to form a bare optical fiber; coating the bare optical fiber with a resin to form an optical fiber; and continuously taking up the optical fiber while applying a tensile force, wherein, when a surface temperature of the cooled and solidified bare optical fiber reached down to 100° C. or lower, a surface of the bare optical fiber is reheated while applying a tensile force so as to remelt only a surface layer of the bare optical fiber, and the surface layer of the bare optical fiber is re-solidified, the bare optical fiber is coated with a resin, and the tensile force is released afterward.

3 Claims, 7 Drawing Sheets

(56) References Cited

U.S. PATENT DOCUMENTS

2009/0145168 A1* 6/2009 Orita et al. .................. 65/384
2011/0085768 A1* 4/2011 Nakanishi ......... C03B 37/02727
                                                    385/102

OTHER PUBLICATIONS

Communication dated Sep. 26, 2014 from the Patent Office of the People's Republic of China in counterpart to Application No. 201280003550.8.

* cited by examiner

METHOD AND APPARATUS FOR MANUFACTURING OPTICAL FIBER

CROSS REFERENCE TO RELATED APPLICATIONS

This application is a continuation application based on a PCT Patent Application No. PCT/JP2012/070620, filed Aug. 13, 2012, whose priority is claimed on Japanese Patent Application No. 2011-176740, filed Aug. 12, 2011, the entire content of which are hereby incorporated by reference.

BACKGROUND OF THE INVENTION

1. Field of the Invention

The present invention relates to a method and an apparatus for manufacturing a silica glass-based optical fiber, and particularly to a method and an apparatus for manufacturing a silica-based optical fiber having bending resistance improved by imparting a residual compressive stress to the surface layer of a bare optical fiber.

2. Description of the Related Art

Generally, in a method for manufacturing a silica glass-based optical fiber, it is common to heat and melt an optical fiber preform made of silica-based glass in a drawing furnace, draw the optical fiber preform into a linear shape from the drawing furnace, cool and solidify it so as to produce a bare optical fiber, further, coat the bare optical fiber with a protective coating resin, pull the bare optical fiber using a take-up machine, and, further, wind the bare optical fiber around a bobbin. Being dependent on the fiber drawing speed, as a manufacturing apparatus applied to the manufacturing of the above silica glass-based optical fiber, it is common practice to use an apparatus as illustrated in FIG. 6 in a case in which the fiber drawing speed is low, and to use an apparatus as illustrated in FIG. 7 in a case in which the fiber drawing speed is high.

The manufacturing apparatus illustrated in FIG. 6 has a drawing furnace 14 for heating and melting an optical fiber preform 12 made of silica-based glass, a cooling zone 18 for cooling and solidifying a bare optical fiber 16 drawn into a linear shape from the drawing furnace 14 in the atmosphere, a coating device 20 for coating the cooled and solidified bare optical fiber 16 with a protective coating resin, a curing device 22 for curing the coating resin using the coating device, a take-up device 26, such as a capstan, for taking up an optical fiber 24 with the cured protective coating resin, and, finally, a winder, which is not shown in the figure, for winding the optical fiber 24.

Meanwhile, in the manufacturing apparatus illustrated in FIG. 7, a cooling device 18A is provided in the cooling zone 18 between the drawing furnace 14 and the coating device 20. The bare optical fiber 16 drawn into a linear shape from the drawing furnace 14 is cooled using the cooling device 18A. Generally, the cooling device 18A has a double-walled structure (jacket structure). In the cooling device 18A, the wall portions are cooled using a cooling medium, such as cooling water, and a cooling gas which has favorable thermal conductivity and has no adverse influence on the material of the bare optical fiber 16, for example, He gas, is introduced into an inside space (cooling space) through which the bare optical fiber 16 passes, so as to cool the bare optical fiber 16.

An optical fiber is manufactured in the following manner using the above optical fiber manufacturing apparatus. The optical fiber preform (silica-based glass preform) 12, which serves as the raw material of the bare optical fiber, is heated at a high temperature of 2000° C. or higher in the drawing furnace 14 so as to be melted. The high-temperature optical fiber preform 12 is drawn downward from the bottom of the drawing furnace 14 while being elongated to be the bare optical fiber 16. The glass material of the bare optical fiber 16 is solidified and cooled (cooling in the atmosphere or cooling using the cooling device 18A) in the cooling zone 18 to a temperature at which the bare optical fiber 16 can be coated with a resin. The bare optical fiber 16 cooled up to the necessary temperature is coated with an uncured resin in the coating device 20 for protection. Further, the coated resin is cured in the curing device 22, thereby forming the optical fiber 24 having a protective coating layer. In the curing of the resin, appropriate means, such as heating, curing, or ultraviolet curing, can be used depending on the type of the resin. The optical fiber 24 is taken up at a predetermined speed through a turn pulley 28 using the take-up device 26. Further, generally, the optical fiber 16 is wound using a winding device, such as a bobbin, through a dancer roller which is not shown in the figure.

In recent years, the development of an optical fiber having excellent bending loss properties has been underway; that is, an optical fiber exhibiting a small bending loss even when bent at a small bend radius is imparted. In an apparatus in which an optical fiber is used, there are cases in which the optical fiber is temporarily bent at a small bend radius of 5 mmφ or less. Meanwhile, in a case in which the optical fiber is bent in a loop shape, a coil shape or other bent shape, a tensile stress is generated on the outside of the bent portion (outside bend). As the bend radius decreases, the tensile stress being exerted to the outside of the bent portion of the optical fiber increases accordingly.

When the tensile stress in the bent portion of the optical fiber exceeds the fracture limit of the material, the optical fiber fractures at the bent portion. In addition, even in a case in which the tensile stress in the bent portion does not exceed the fracture limit of the material, when the optical fiber stays bent for a long period of time or is repeatedly bent, the optical fiber fractures in the bent portion due to fatigue fracture. Therefore, if it is assumed that the optical fiber is used while being bent at a small bend radius, the optical fiber needs to be excellent in terms of bending resistance. Since the fracture in the bent portion results mainly from the tensile stress being exerted to the outside of the bent portion as described above, the relaxation of the tensile stress on the outside of the bent portion, which is generated when the optical fiber is bent, can be considered for improving the bending resistance.

A method for improving the bending resistance from the above viewpoint has already been proposed in Japanese Unexamined Patent Application, First Publication No. H1-301531 (hereinafter referred to as PTL 1). PTL 1 discloses that, in a process in which a glass preform is softened, melted and continuously drawn into a fiber (fibrillation), after a bare optical fiber is solidified, the surface of the bare optical fiber is reheated while a tensile force for fiber-drawing is applied to the optical fiber so as to soften and melt only the surface layer (therefore the center portions stay solidified), and, subsequently, the surface layer is re-solidified while the tensile force is applied. In this method, it is possible to eliminate fine cracks on the surface by remelting only the surface layer of the bare optical fiber which has been fully solidified temporarily. Further, a strain generated in the bare optical fiber due to the tensile force for fiber drawing (tensile strain) is relaxed in the surface layer of the bare optical fiber so that a compressive stress remains in the surface layer when the tensile force is released afterward. In such a manner, when an optical fiber having a compressive stress remaining on the surface is bent, the tensile stress generated in the surface layer on the outside of the bent portion is relaxed or canceled out by the residual compressive stress. Therefore, even in a case in which the bend radius is small, the tensile stress being exerted to the outside of the bent portion substantially decreases, and, consequently, cracking or fracturing due to bending is not easily caused.

However, as a result of carrying out experiments regarding the method disclosed in PTL 1, the present inventors found the following problems.

That is, PTL 1 simply proposes that, after the bare optical fiber drawn from the drawing furnace is cooled so as to be fully solidified, the surface of the bare optical fiber is reheated in the presence of a tensile force so as to remelt the surface layer. In particular, regarding the temperature of the bare optical fiber when the surface of the bare optical fiber is reheated so as to remelt the surface layer, PTL 1 only describes an example in which the reheating of the bare optical fiber cooled to approximately 200° C. The inventors found that, when the surface layer is reheated in the step in which the bare optical fiber is fully solidified, and is re-solidified according to the method described in PTL 1, there are many cases in which the residual compressive stress cannot be stably imparted to the surface layer of the optical fiber in the bare fiber portion after the release of the tensile force. Particularly, it was found that, in a case in which the surface layer is reheated and re-solidified in a step in which the bare optical fiber is cooled up to the temperature, that is, approximately 200° C. as described in an example of PTL 1, the residual compressive stress is not imparted to the surface layer of the optical fiber in the bare fiber portion after the release of the tensile force, or the residual compressive stress is not uniformly imparted in the longitudinal direction throughout the optical fiber such that the bending resistance cannot be reliably and stably improved.

The present invention has been made in consideration of the above circumstances, and an object of the present invention is to provide a method and an apparatus for manufacturing an optical fiber in which a residual compressive stress is reliably and stably imparted to the surface layer of the bare optical fiber portion so that the bending resistance is reliably and stably excellent.

SUMMARY OF THE INVENTION

As a result of repeating a variety of experiments and studies in order to solve the above problems, the inventors found that the temperature condition on the surface of the bare optical fiber when the surface layer of the bare optical fiber is remelted is an important element in order to reliably and stably impart a residual compressive stress. An experiment of heating and remelting the surface while variously changing the temperature of the surface of the bare optical fiber when the surface layer of the bare optical fiber was remelted was carried out. As a result, it was newly found that, in a case in which the surface is heated and remelted while the surface temperature exceeds 100° C., the residual compressive stress is not stably imparted after the release of the tensile force; however, when the surface is heated and remelted after the surface temperature reaches down to 100° C. or lower, the residual compressive stress is reliably and stably present after the release of the tensile force, and thus completing the present invention.

Specifically, a method for manufacturing an optical fiber according to a first aspect of the present invention includes the steps of: heating and melting a silica-based optical fiber preform in a drawing furnace; drawing the melted preform into a linear shape from the drawing furnace, continuously cooling and solidifying the preform to form a bare optical fiber; coating the bare optical fiber with a resin to form an optical fiber; and continuously taking up the optical fiber while applying a tensile force using a take-up machine, wherein, when a surface temperature of the cooled and solidified bare optical fiber reached down to 100° C. or lower, a surface of the bare optical fiber is reheated while applying a tensile force so as to remelt only a surface layer of the bare optical fiber, and the surface layer of the bare optical fiber that has been remelted is re-solidified, then, the bare optical fiber is coated with a resin, and the tensile force is released afterward, thereby obtaining an optical fiber having a residual compressive stress imparted to the surface layer in the bare optical fiber portion.

In the method for manufacturing an optical fiber according to the first aspect, it may be arranged such that the preform with a linear shape drawn from the drawing furnace is cooled and solidified through cooling in the atmosphere, and a time period from when the preform is drawn from the drawing furnace to when the reheating begins is set to 2 seconds or more.

In the method for manufacturing an optical fiber according to the first aspect, it may be arranged such that the preform with a linear shape drawn from the drawing furnace is made to continuously pass through a cooling device so as to be cooled and solidified, and the reheating begins when the surface temperature of the bare optical fiber drawn from the cooling device reached down to 100° C. or lower.

An apparatus for manufacturing an optical fiber according to a second aspect of the present invention includes: a drawing furnace configured to heat and melt an optical fiber preform; a cooling zone configured to cool and solidify a bare optical fiber drawn into a linear shape from the drawing furnace; a reheating device configured to reheat a surface of the cooled and solidified bare optical fiber in a step in which a surface temperature reaches down to 100° C. or lower so as to remelt only a surface layer; a re-cooling zone for cooling and re-solidifying the surface layer of the bare optical fiber that has been remelted using the reheating device; a coating device configured to coat the bare optical fiber that has been cooled in the re-cooling zone with a resin; and a take-up device configured to take up the optical fiber having the cured resin applied using the coating device while loading a tensile force.

In the apparatus for manufacturing an optical fiber according to the second aspect, it may be arranged such that the cooling zone is configured to cool the bare optical fiber in the atmosphere.

In the apparatus for manufacturing an optical fiber according to the second aspect, it may be arranged such that a cooling device configured to cool the bare optical fiber is provided in the cooling zone.

In accordance with the method for manufacturing an optical fiber according to some aspects of the present invention, it is possible to reliably and stably impart a residual compressive stress to the surface layers of bare fibers in the optical fibers after the release of the tensile force. Therefore, it is possible to reliably and stably manufacture an optical fiber in which there is little concern that cracking or fracturing may occur on the outside of the bent portion, that is, an optical fiber having excellent bending resistance, even in a case in which the optical fiber is repeatedly bent at a small bend radius. In addition, in accordance with the method for manufacturing an optical fiber according to some aspect of the present invention, it is possible to manufacture optical fibers that are excellent in terms of bending resistance as described above at a mass production scale.

DESCRIPTION OF THE PREFERRED EMBODIMENTS

Hereinafter, the respective embodiments of the present invention will be described in detail with reference to the accompanying drawings.

Figure 1:
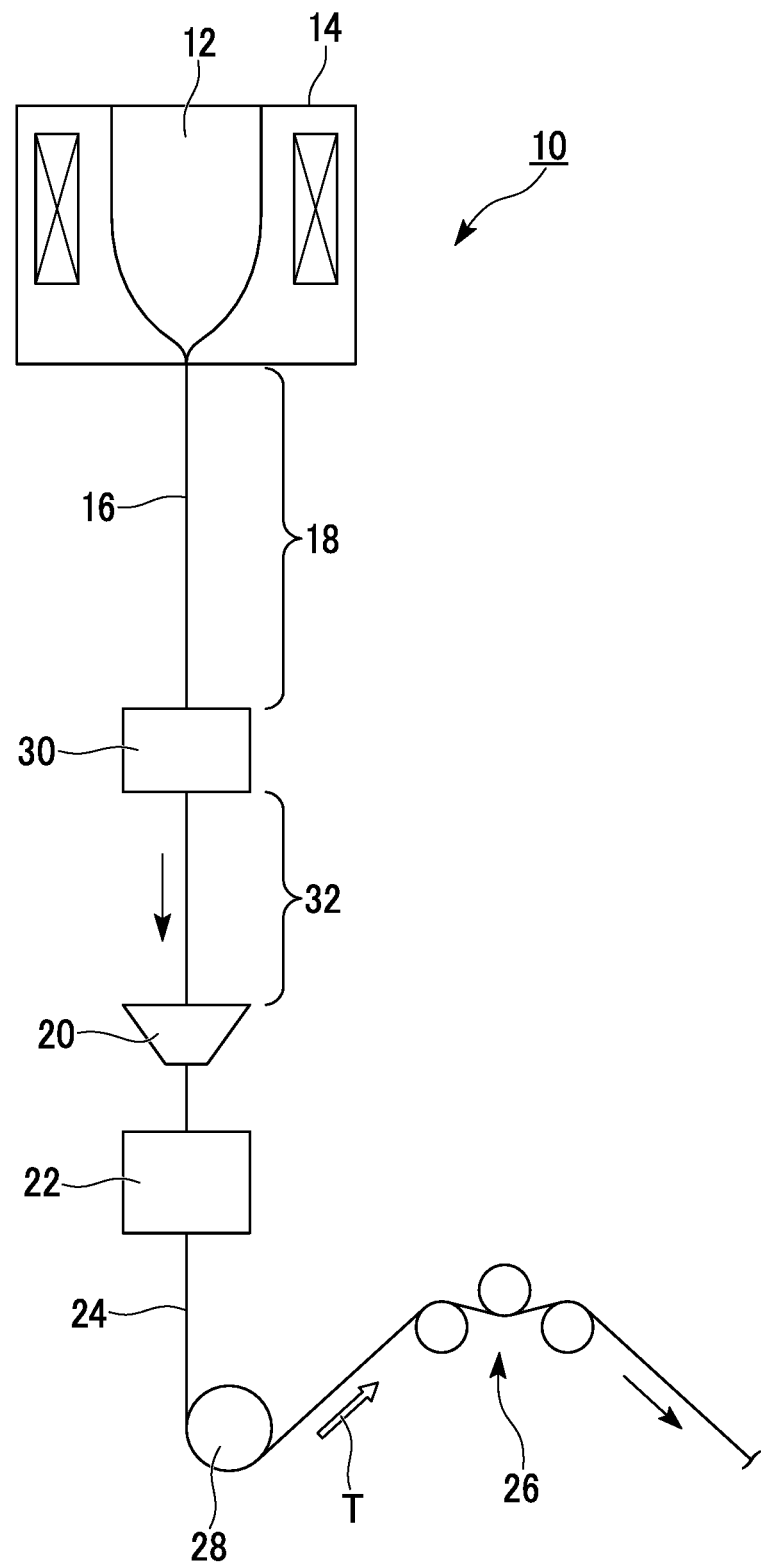
FIG. 1 is a schematic view illustrating an example of an apparatus for carrying out the method for manufacturing an optical fiber according to a first embodiment of the present invention.

FIG. 1 is a view illustrating the overall configuration of an apparatus for manufacturing an optical fiber 10 for carrying out the method for manufacturing an optical fiber according to the first embodiment of the present invention. The apparatus for manufacturing an optical fiber 10 illustrated in FIG. 1 is preferably applied in a case in which the drawing speed is low.

In FIG. 1, the apparatus for manufacturing an optical fiber 10 has a drawing furnace 14 configured to heat and melt an optical fiber preform 12 made of, for example, silica-based glass; a cooling zone 18 configured to cool and solidify a bare optical fiber 16 drawn downward into a linear shape from the drawing furnace 14; a reheating device 30 configured to reheat the surface of the cooled and solidified bare optical fiber 16 so as to remelt only the surface layer; a re-cooling zone 32 for re-solidifying the surface layer that has been remelted; a coating device 20 configured to coat the bare optical fiber having the surface layer that has been re-solidified with a protective coating resin; a curing device 22 provided as necessary in order to cure the resin applied using the coating device 20, and a take-up device 26 configured to load a tensile force to an optical fiber 24 in order to take up the optical fiber 24 having the cured protective coating resin. Meanwhile, here, the sentence "the surface of the bare optical fiber 16 is reheated so as to remelt only the surface layer" means that only the surface layer of the silica-based glass that configures the bare optical fiber 6 is heated to a temperature or more at which the surface layer is softened so that the bare optical fiber exhibits fluidity. In other words, the sentence means that the surface layer is heated to a temperature or more at which strain in the surface layer is removed, but the portion inside the surface layer is held in a state of being hardened, that is, a state in which strain is not removed. In addition, the "re-solidifying" means that the softened surface layer is cured again through cooling so as to return to a state of no fluidity.

In the first embodiment, the cooling zone 18 refers to an area in which the bare optical fiber 16 is made to pass through the atmosphere so as to be air-cooled. In addition, the re-cooling zone 32 also refers to an area in which the bare optical fiber 16 is made to pass through the atmosphere so as to be air-cooled.

The length of the cooling zone 18 is set to an appropriate length depending on the drawing speed of the bare optical fiber 16 so that two seconds or more can be ensured for the time period during which the bare optical fiber 16 discharged from the drawing furnace 14 reaches the entrance of the reheating device 30. In other words, the length is determined so that the bare optical fiber 16 is air-cooled in the atmosphere for two seconds or more in the cooling zone 18. Such a setting is suitable for a case in which the fiber drawing speed is low, for example, approximately 5 m/min to 100 m/min. It is confirmed through experiments by the inventors that, when the bare optical fiber 16 is air-cooled for two seconds or more while the bare optical fiber is discharged from the drawing furnace 14 and then reaches the entrance of the reheating device 30, the surface temperature of the bare optical fiber 16 reached down to 100° C. or lower when the bare optical fiber enters the reheating device 30. That is, in a case in which the drawing speed is low, the bare optical fiber 16 drawn into a linear shape from the drawing furnace 14 can be cooled and solidified through cooling in the atmosphere. In this case, it is possible to use the elapsed time from when the bare optical fiber is drawn from the drawing furnace 14 as an index of the surface temperature of the bare optical fiber 16, and it is possible to assume that the surface temperature of the bare optical fiber 16 reached down to 100° C. or lower when the elapsed time becomes two seconds or more.

Meanwhile, the reheating device 30 is not limited as long as the device can rapidly heat the bare optical fiber 16 to a temperature at which the surface layer is melted, that is, the surface layer is softened so as to exhibit fluidity so that strain is removed (for example, 1600° C. or higher) in a short period of time. The specific configuration of the reheating device 30 is not particularly limited, but a $CO_2$ laser device is a typical device, and, additionally, an electric furnace, an oxy-hydrogen burner, or the like may also be used.

In FIG. 1, one coating device 20 and one curing device 22 are provided respectively; however, depending on the case, it may be arranged such that a first coating device and a first curing device, and a second coating device and a second curing device are provided in series to apply two layers. In addition, as illustrated in FIG. 1, even in a case in which one coating device and one curing device are provided respectively, two layers may be applied using a coating device that can apply two layers collectively. This shall apply even in a manufacturing apparatus in FIG. 2 (second embodiment), described below.

Hereinafter, the method for manufacturing an optical fiber according to the first embodiment of the present invention when using the apparatus for manufacturing an optical fiber in FIG. 1 will be described referring to FIG. 2. It should be noted that, in FIG. 2, the dotted portions indicate the melted portions in the optical fiber preform 12 and the bare optical fiber 16.

Figure 2:
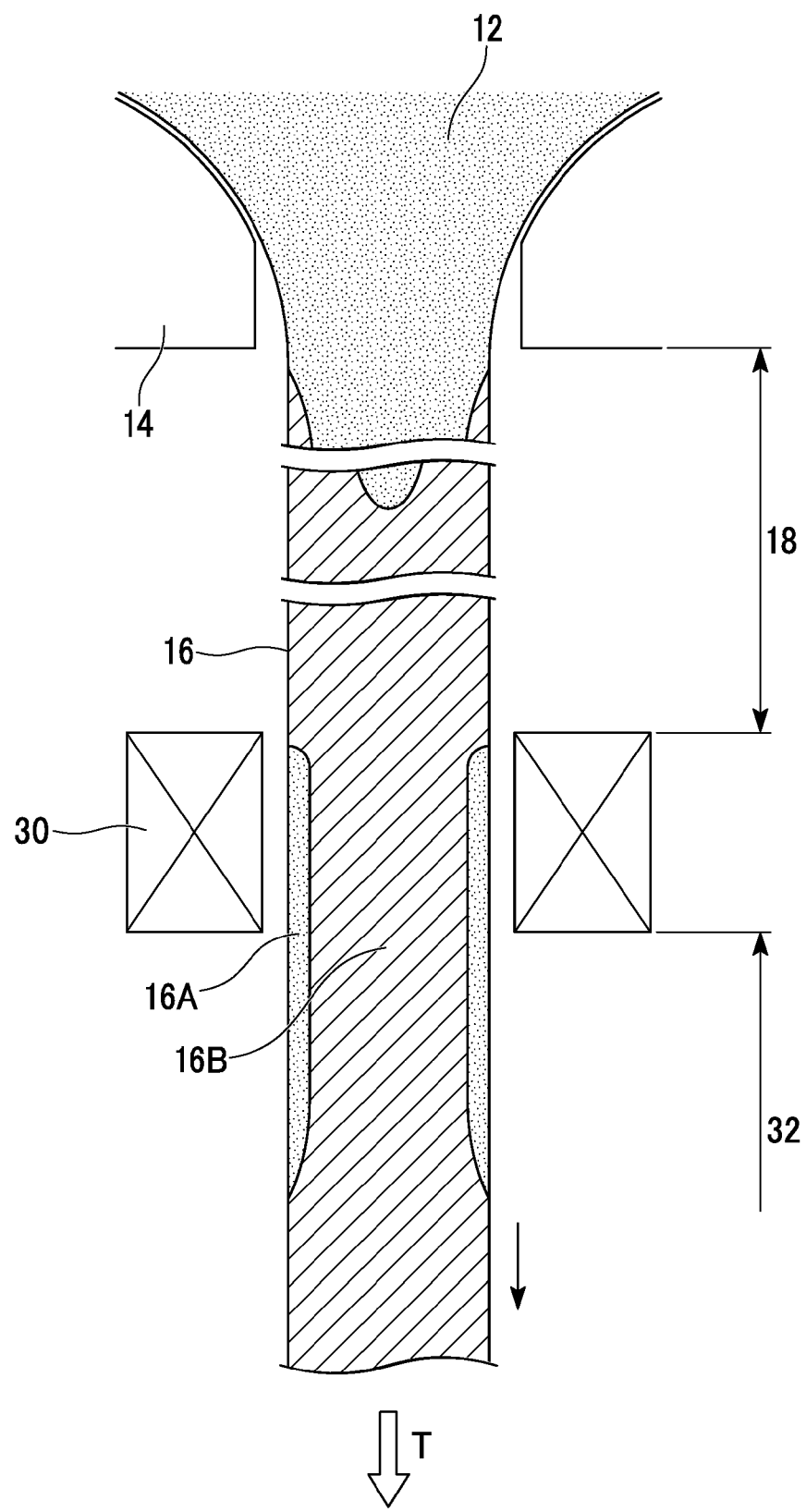
FIG. 2 is a pattern diagram for explaining the status of a bare optical fiber in a process for manufacturing an optical fiber by applying the method for manufacturing an optical fiber according to the first embodiment of the present invention.

In FIGS. 1 and 2, the optical fiber preform 12 heated at a high temperature of 2000° C. or more so as to be melted in the drawing furnace 14 is drawn as the bare optical fiber 16 from the bottom end of the drawing furnace 14 by a tensile force T from the take-up device 26 at a low speed of, for example, approximately 5 m/min to 100 m/min. The bare optical fiber 16 is made to immediately pass through the cooling zone 18. While passing through the cooling zone 18, the bare optical fiber 16 is cooled by the atmosphere at approximately room temperature to decrease the temperature. In the middle of the passage, the bare optical fiber 16 is solidified up to the center portion thereof, and, further, the cooling proceeds. In addition, when two seconds or more elapses from the discharge from the drawing furnace 14 so that the surface temperature of the bare optical fiber 16 reached down to 100° C. or lower, the surface of the bare optical fiber 16 is heated using the reheating device 30 so that only a surface layer 16A is melted. That is, only the surface layer 16A which is from the surface to a predetermined depth is melted while the center portion 16B of the bare optical fiber 16 is held in a solidified state.

Here, the tensile force T from the take-up device 26 is exerted to the entire bare optical fiber 16, which has been solidified up to the center portion 16B in the cooling zone 18, so that a tensile strain is generated due to a tensile stress. Since the surface layer 16A, which has been remelted using the reheating device 30 is softened so as to be into a fluidic state, the tensile strain is temporarily released, and the tensile force T from the take-up device 26 is loaded only on the center portion 1613 which has not been remelted. Subsequently, the bare optical fiber 16 is made to pass through the re-cooling zone 32 and is cooled from the surface by the atmosphere at room temperature, whereby the surface layer 16A is re-solidified. After that, the base optical fiber 16 is made to pass through the coating device 20 and the curing device 22 so as to be coated with the protective coating resin, whereby the optical fiber 24 applied with the protective coating is obtained. The optical fiber 24 is taken up using the take-up device 26 while loaded with the tensile force T, and is wound around the winding device, such as a bobbin, which is not shown in the figure.

The tensile force T is applied to the bare optical fiber 16 and the optical fiber 24 from when the bare optical fiber discharged from the drawing furnace 14 is solidified in the middle of the cooling zone 18 to when the optical fiber is taken up using the take-up device 26. Particularly, since a tensile stress is continuously generated due to the tensile force T in the center portion (the portion which has not been remelted) 16B of the bare optical fiber 16 from the solidification to the winding, strain (tensile strain) is accumulated. On the other hand, in the surface layer (the portion which has been remelted) 16A of the bare optical fiber 16, the tensile strain is temporarily released due to the remelting, the surface layer is subsequently re-solidified, and only little tensile strain remains. Therefore, after taking up the optical fiber using the take-up device 26, a large tensile strain remains in the center portion 16B of the bare optical fiber, and only a smaller tensile strain 16B remains in the surface layer 16A. When the tensile force T is released after the take-up, the bare optical fiber portion elastically deforms in a direction in which the tensile strain (particularly, the large tensile strain in the center portion) is released, that is, a compressive direction. At this time, since there is a large difference in the tensile strain between the center portion 16B and the surface layer 16A, the tensile strain in the center portion 16B disappears (or decreases). At the same time, a compressive stress is generated in the surface layer 16A, and the compressive stress remains even after the release of the tensile force. That is, a residual compressive stress is imparted to the surface layer 16A. In a case in which the optical fiber with the residual compressive stress imparted in the surface layer 16A of the bare optical fiber portion in the above manner is bent, a tensile stress is generated in the surface layer on the outside of the bent portion, while the residual compressive stress is present in advance in the surface layer. Therefore, the tensile stress being exerted to the surface layer on the outside of the bending is canceled out by the residual compressive stress, or is at least relaxed by the residual compressive stress. As a result, the occurrence of cracking in the outside surface of the bent portion or the occurrence of fracture from the outside of the bent portion is effectively prevented due to the tensile stress applied to the outside of the bent portion. Therefore, even in the case of a small bend radius, excellent bending resistance is exhibited.

In a case in which the cooling is insufficient since the cooling time in the cooling zone 18 is as short as two seconds or less, and the surface temperature is a high temperature (100° C. or higher, for example, 200° C. described in PTL 1) when reheating the surface layer of the bare optical fiber 16, the center portion of the bare optical fiber 16 is also at a very high temperature at this time. Therefore, the center portion reaches a higher temperature due to the reheating, and thus the center portion is softened, while not melted, such that the tensile strain in the center portion is also relaxed. As a result, it becomes difficult to give a sufficiently large difference in the tensile strain between the surface layer and the center portion, and it becomes difficult to impart a sufficient compressive residual stress to the surface layer even after the release of the tensile force. In addition, in a case in which the bare optical fiber is not sufficiently cooled such that the surface temperature does not reach down to 100° C. or lower during the reheating for remelting the surface layer, the variation in the temperature of the center portion during the reheating is also large. Therefore, the occurrence of the relaxation of the tensile strain or the degree of the relaxation in the center portion also significantly varies. For example, while the tensile strain in the center portion is not relaxed in a certain location in the longitudinal direction of the bare optical fiber, the tensile strain in the center portion is significantly relaxed in another location in the longitudinal direction. As a result, after the tensile force is finally released, some areas in the surface layer are imparted with the residual compressive stress, and some other areas are not imparted with the residual compressive stress, and therefore there is a concern that the bending resistance may vary in the longitudinal direction.

When two seconds or more is ensured as the time from when the bare optical fiber 16 discharged from the drawing furnace 14 passes through the cooling zone 18 in which air cooling using the atmosphere is performed to when the bare optical fiber 16 reaches the entrance of the reheating device 30 so that the surface is sufficiently cooled so as to reach as low a temperature as 100° C. or lower until immediately before the reheating using the reheating device 30, the temperature of the center portion will also decrease sufficiently at this time. Therefore, it is possible to sufficiently ensure the temperature difference between the center portion and the surface even when the bare optical fiber is reheated. Further, it is also possible to make the temperature variation in the center portion relatively small. Therefore, the relaxation of the tensile strain in the center portion and the occurrence of the variation in the tensile strain in the center portion can be prevented. Accordingly, it is possible to ensure a large difference in the tensile strain between the center portion and the surface layer while a tensile force is being loaded, and it is possible to decrease the variation in the difference of the tensile strain and to sufficiently impart the residual compressive stress to the surface layer after the release of the tensile force. Further, it is also possible to decrease the variation in the residual compressive stress in the surface layer.

Figure 3:
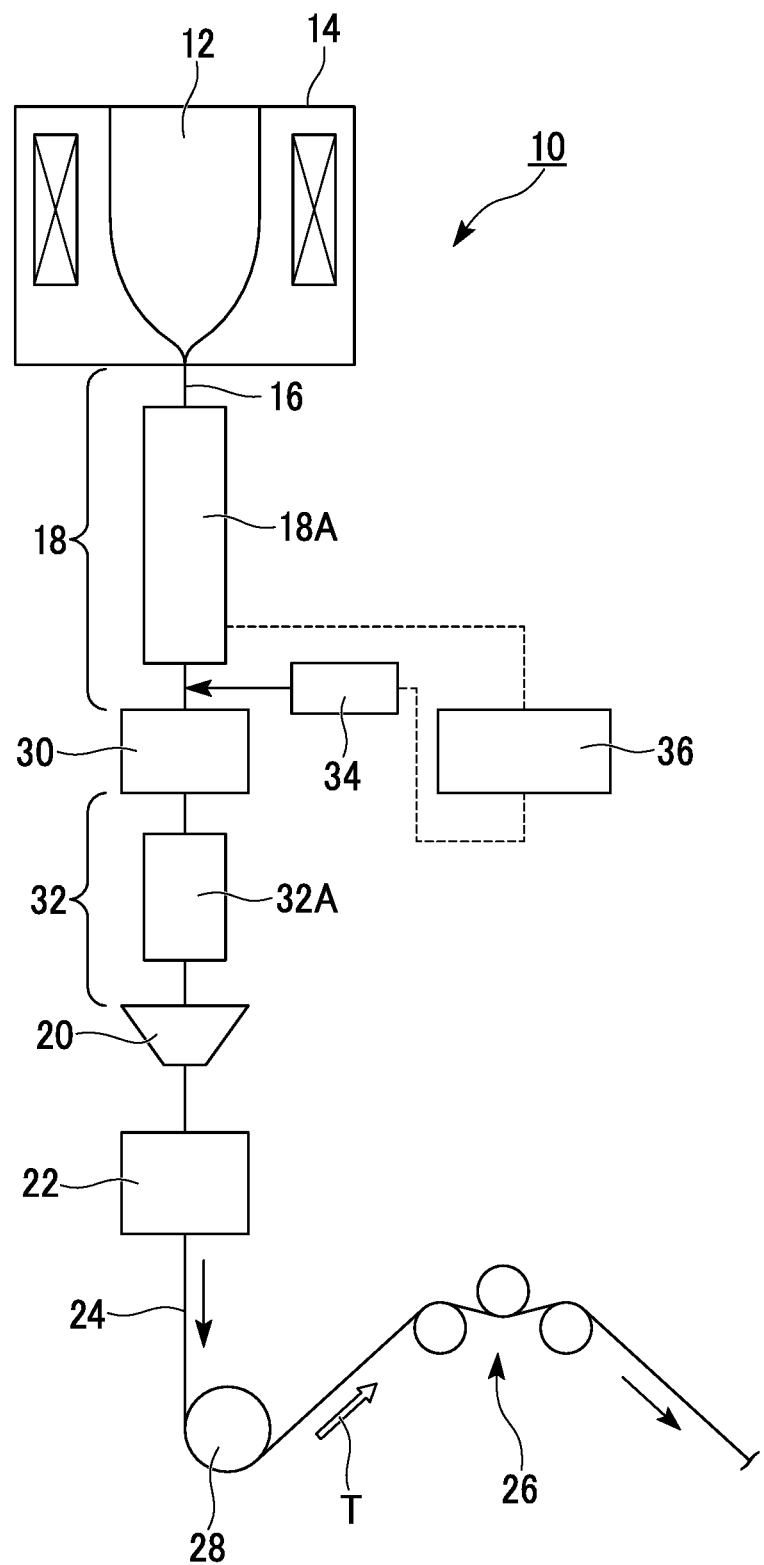
FIG. 3 is a schematic view illustrating an example of an apparatus for carrying out a method for manufacturing an optical fiber according to a second embodiment of the present invention.

FIG. 3 illustrates the overall configuration of an apparatus for manufacturing an optical fiber for carrying out the method for manufacturing an optical fiber according to the second embodiment of the present invention. The apparatus for manufacturing an optical fiber illustrated in FIG. 3 is suitable for a case in which the drawing speed is high, for example, a case in which the drawing speed is approximately 100 m/min to 1000 m/min. It should be noted that, in FIG. 3, the same elements as the elements illustrated in FIG. 1 will be given the same reference numbers as in FIG. 1, and will not be described.

In the apparatus according to the second embodiment, a cooling device 18A is provided in the cooling zone 18 configured to cool and solidify the bare optical fiber 16 drawn from the drawing furnace 14. That is, in a case in which the drawing speed is high, it is preferable that the bare optical fiber 16 drawn into a linear shape from the drawing furnace 14 be cooled using the cooling device 18A. In that case, the reheating begins when the surface temperature of the bare optical fiber 16 drawn from the cooling device 18A reached down to 100° C. or lower so that only the surface layer of the bare optical fiber 16 is remelted, and then re-solidified, whereby the compressive residual stress can be reliably and stably imparted to the bare fiber portion of the optical fiber 16 after the release of the tensile force. The cooling device 18A has a cooling capability controlled by a cooling control device 36, and the specific configuration thereof is not particularly limited as long as the cooling capability of the cooling device can be adjusted. For example, it is possible to use a cooling device having a double-walled structure (jacket structure) surrounding the area through which the bare optical fiber 16 passes. In the cooling device having a double-walled structure, for example, the wall portions are cooled using a cooling medium, such as cooling water and a cooling gas which has favorable thermal conductivity and has no adverse influence on the material of the bare optical fiber 16, for example, He gas, is introduced into the inside area through which the bare optical fiber 16 passes (cooling space), so as to cool the bare optical fiber 16. Further, it is also possible to control the cooling capability with respect to the bare optical fiber 16 by controlling the flow amount of the cooling gas introduced by the cooling control device 36. Moreover, a surface temperature detection device 34 configured to measure the surface temperature of the bare optical fiber 16, for example, a radiation thermometer, is provided at a location below the cooling device 18A and immediately above the reheating device 30 (in the vicinity of the entrance of the reheating device 30). A surface temperature signal obtained by the surface temperature detection device 34 is sent to the cooling device 36, and the cooling capability of the cooling device 18A is controlled by the cooling control device 36. In addition, a cooling device 32A for re-cooling is provided in the re-cooling zone 32 for re-cooling the bare optical fiber 16 of which only the surface layer is remelted by the reheating device 30. The specific configuration of the cooling device 32A for re-cooling is not particularly limited. For example, similarly to the f cooling device 18A, it is possible to use a cooling device having a double-walled structure (jacket structure) surrounding the area through which the bare optical fiber 16 passes. In the cooling device having a double-walled structure, for example, the wall portions are cooled using a cooling medium, such as cooling water and a cooling gas which has favorable thermal conductivity and has no adverse influence on the material of the bare optical fiber 16, for example, He gas, is introduced into the inside area through which the bare optical fiber 16 passes (cooling space), so as to cool the bare optical fiber 16.

A method for manufacturing an optical fiber according to the second embodiment of the present invention, in which the above apparatus for manufacturing an optical fiber illustrated in FIG. 3 is used, will be described.

In FIG. 3, the optical fiber preform 12, which has been heated at a high temperature of 2000° C. or more in the drawing furnace 14 so as to be melted, is drawn into a linear shape as the bare optical fiber 16 from the bottom end of the drawing furnace 14 using the take-up force (tensile force) T from the take-up device 26 at a high speed of, for example, approximately 100 m/min to 1000 m/min. The bare optical fiber 16 is made to pass through the cooling device 18A in the cooling zone 18. While passing through the cooling device 18A, the bare optical fiber 16 is cooled, and the temperature rapidly decreases. In the middle of the cooling, the bare optical fiber 16 is solidified to the center portion, and, further, the cooling proceeds. Meanwhile, the surface temperature of the bare optical fiber 16 is measured by the surface temperature detection device 34 disposed in the vicinity of the entrance of the reheating device 30 when the bare optical fiber is made to enter the reheating device 30. The cooling capability of the cooling device 18A is feed-back-controlled by the cooling control device 36 so that the temperature reached down to 100° C. or lower. For example, the flow amount of the cooling gas flowing into the cooling control device 36 is controlled depending on the surface temperature detected as described above. Using the above control, the bare optical fiber 16 is cooled so that the surface temperature reaches down to 100° C. or lower. After the surface temperature of the bare optical fiber 16 reached down to 100° C. or lower, the surface of the bare optical fiber 16 is reheated by the reheating device 30 so that only the surface layer is melted. That is, only the surface layer portion of the bare optical fiber 16 is melted while the center portion thereof is held in a solidified state.

Here, similarly to the case of the first embodiment illustrated in FIG. 1, the tensile force T from the take-up device 26 is exerted to the entire bare optical fiber 16 which has been solidified up to the center portion in the cooling device 18A; thereby generating a tensile strain. In addition, since the surface layer of the bare optical fiber 16 which has been remelted by the reheating device 30, is softened so as to have fluidity, the tensile strain is temporarily released in the surface layer, and the tensile force T from the take-up device 26 is loaded only on the center portion which has not been remelted.

Subsequently, the bare optical fiber 16 is made to pass through the cooling device 32A in the re-cooling zone 32. In the cooling device 32A, the bare optical fiber 16 is cooled from the surface, whereby the surface layer is re-solidified. After that, the base optical fiber 16 is made to pass through the coating device 20 and the curing device 22 so as to be coated with the protective coating resin, whereby the optical fiber 24 applied with the protective coating is obtained. The optical fiber 24 is taken up by the take-up device 26 while loaded with the tensile force T, and is wound around the winding device, such as a bobbin, which is not shown the figure.

As such, even in the manufacturing method according to the second embodiment, in which the apparatus for manufacturing an optical fiber illustrated in FIG. 3 is used, the reheating for melting only the surface layer of the bare optical fiber 16 is performed after the bare optical fiber is sufficiently cooled so that the surface temperature reaches down to 100° C. or lower. Similarly to the first embodiment, the temperature of the center portion also decreases sufficiently when the reheating begins. Therefore, the temperature of the center portion does not become so high when the bare optical fiber is reheated for remelting the surface layer, and, further, it is also possible to make the variation in the temperature of the center portion relatively small. Therefore, the relaxation of the tensile strain in the center portion and the occurrence of the variation in the tensile strain in the center portion can be prevented. Therefore, it is possible to ensure a large difference in the tensile strain between the center portion and the surface layer while a tensile force is being loaded, and it is possible to decrease the variation in the difference of the tensile strain and to sufficiently impart the residual compressive stress to the surface layer after the release of the tensile force. Further, it is also possible to decrease the variation in the residual compressive stress in the surface layer.

In the above, in the bare optical fiber, the thickness (remelting depth) of the surface layer remelted by reheating from the surface, is not particularly limited; however, in the case of the diameter of the bare optical fiber (ordinarily in a range of approximately 80 µm to 150 µm, and typically often 125 µm) of an ordinary communication optical fiber, it is preferable that the bare optical fiber be remelted so that the compressive strain is imparted up to a depth of approximately 2 µm to 10 µm from the surface. When the compressive strain is imparted only to a depth of less than 2 µm from the surface, there is a concern that it may become difficult to impart a sufficient residual compressive stress for improving the bending resistance. On the other hand, when a compressive strain is imparted to a depth of more than 10 µm from the surface, there is a concern that the optical properties of the optical fiber may be adversely influenced.

Hereinafter, examples of the present invention will be described together with comparative examples. Meanwhile, the following examples are for clarifying the functions and effects of the present invention, and the conditions described in the examples do not limit the technical scope of the present invention.

EXAMPLES

Example 1

Example 1 is an example in which the method for manufacturing an optical fiber according to the first embodiment of the present invention is carried out using the apparatus illustrated in FIG. 1.

In particular, a two-layer coating-structured silica glass-based optical fiber (with a diameter of the bare optical fiber of 125 µm and a finished outer diameter of the fiber of 250 µm) having the properties of an ordinary single-mode fiber was manufactured in the following manner. The bare optical fiber 16 drawn from the drawing furnace 14 was air-cooled in the atmosphere in the cooling zone 18, and then only the surface layer of the bare optical fiber was melted by the reheating device 30. Subsequently, the surface layer was re-solidified in the re-cooling zone 32. After that, a protective coating layer made of an ultraviolet-curable resin was formed, and the bare optical fiber was taken up by the take-up device 26 with a tensile force of approximately 100 gf. Here, the time period during which the bare optical fiber was discharged from the bottom end of the drawing furnace 14 and then reached the reheating device 30, that is, the cooling time in the cooling zone 18 was changed at intervals of 0.5 seconds in a range of 2 seconds to 5 seconds. In addition, the take-up speed (drawing speed) was changed variously in a range of 5 m/min to 100 m/min.

As a result of investigating the residual stresses in the surface layers of the bare fiber portions after the release of the tensile force in the respective obtained optical fibers, it was confirmed that the residual compressive stress was almost uniformly imparted in the surface layer of the bare fiber throughout the optical fiber in the longitudinal direction. Typically, it was confirmed that, in a case in which the drawing speed was 20 m/min and the cooling time was two seconds, a residual compressive stress of approximately 50 MPa was almost uniformly imparted in the longitudinal direction in the surface layer of the bare fiber portion after the release of the tensile force. In addition, when the optical fibers imparted with the residual compressive stress were actually bent, fracturing did not occur due to the application of bending even at a bend radius of 2.0 mmφ.

In determining the presence of the residual compressive stress, when the measured value of the residual compressive stress on the surface, which was measured using a fiber stress analyzer (FSA) manufactured by FOSE Co., Ltd., was 5 MPa or more was determined as the residual compressive stress was "present", and when the residual compressive stress on the surface was less than 5 MPa was determined as the residual compressive stress was "absent".

In addition, in Example 1, it was confirmed that, at a cooling time of 2 seconds or more, the surface temperature of the bare optical fiber at the entrance of the reheating device 30 reached down to 100° C. or lower.

Comparative Example 1

Similarly to Example 1, a two-layer coating-structured silica glass-based optical fiber (with a diameter of the bare optical fiber of 125 µm and a finished outer diameter of the fiber of 250 µm) having the properties of an ordinary single-mode fiber was manufactured in the following manner. The bare optical fiber 16 drawn from the drawing furnace 14 was air-cooled in the atmosphere in the cooling zone 18, and then only the surface layer of the bare optical fiber was melted by the reheating device 30. Subsequently, the surface layer was re-solidified in the re-cooling zone 32. After that, a protective coating layer made of an ultraviolet-curable resin was formed, and the bare optical fiber was taken up by the take-up device 26 with a tensile force of approximately 100 gf. Here, the time period during which the bare optical fiber was discharged from the bottom end of the drawing furnace 14 and then reached the reheating device 30, that is, the cooling time in the cooling zone 18 was changed at intervals of 0.5 seconds in a range of 1.5 seconds to 0.5 seconds, that is less than two seconds. In addition, the take-up speed (drawing speed) was changed variously in a range of 5 m/min to 100 m/min, similarly to Example 1.

As a result of investigating the residual stresses in the surface layers of the bare fiber portions after the release of the tensile force in the respective obtained optical fibers, it was determined that, in a case in which the cooling time was 1.5 seconds, some areas were imparted with the residual compressive stress, and some other areas are not imparted with the residual compressive stress in the longitudinal direction of the optical fiber in all drawing speed. That is, it was determined that there was a variation in the presence of the residual compressive stress. In addition, it was confirmed that, in a case in which the cooling times were 1.0 second and 0.5 seconds, the residual compressive stress was not imparted to the surface layers of the bare fiber portions in all drawing speed.

In addition, it was confirmed that, when optical fibers to which the residual compressive stress was not imparted or the presence of the residual compressive stress varied in the longitudinal direction were actually bent, cracking or fracturing occurred on the outside of the bent portions in all the optical fibers if the optical fibers were bent at a bend radius of 2.0 mmφ.

In Comparative example 1, it was confirmed that, at a cooling time of 1.5 seconds to 0.5 seconds, the surface temperature of the bare optical fiber at the entrance of the reheating device 30 exceeded 100° C.

Figure 4:
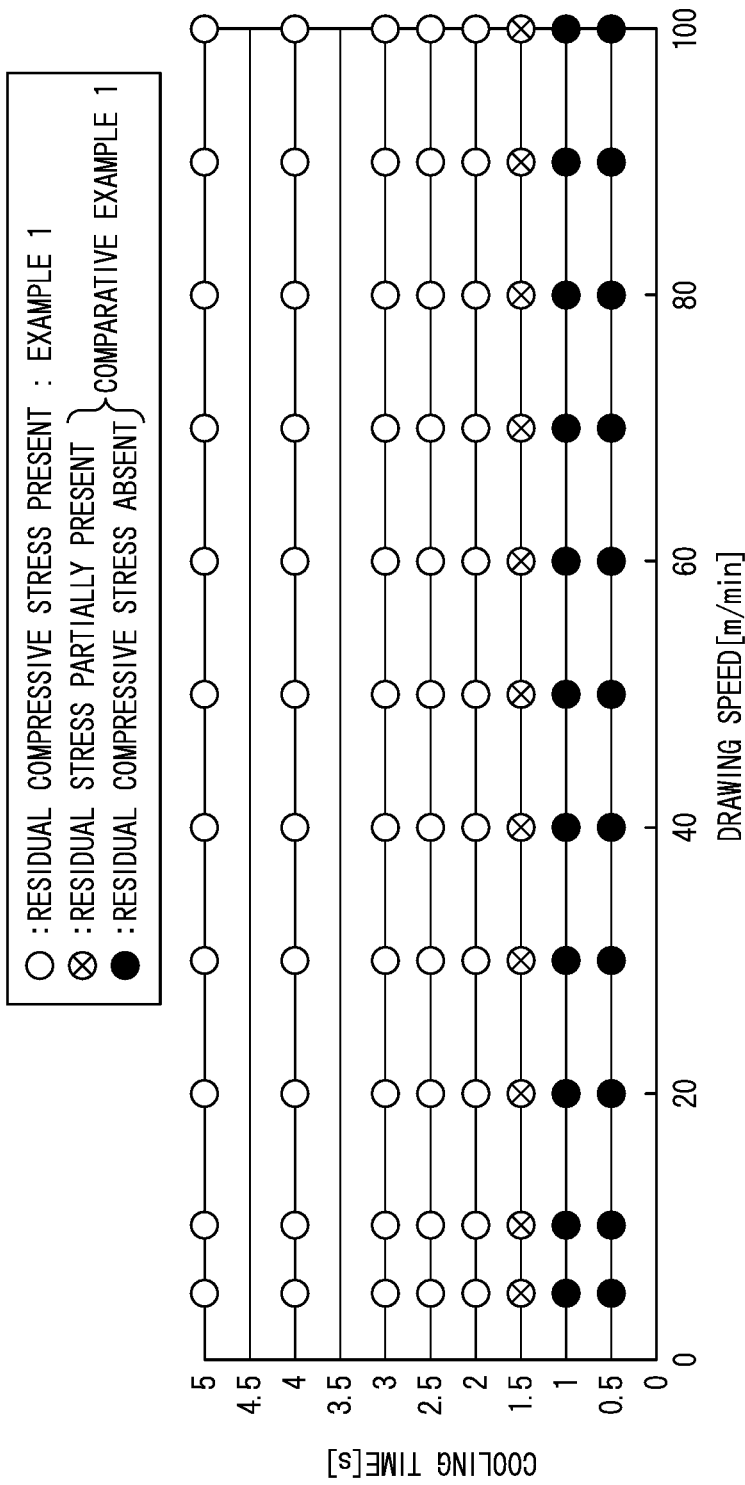
FIG. 4 illustrates graphs showing the results of the presence of the residual compressive stress of Example 1 of the present invention and Comparative example 1.

The results of the presence of the residual compression after the release of the tensile force at the respective drawing speed and the respective cooling times, in the above Example 1 and Comparative example 1, are summarized in FIG. 4. It is evident from FIG. 4 that, when using the apparatus as illustrated in FIG. 1, if the cooling time in the atmosphere in the cooling zone 18 is 2 seconds or more, the residual compressive stress can be stably imparted to the optical fibers which are manufactured at drawing speed in a range of 5 m/min to 100 m/min after the release of the tensile force.

Example 2

Example 2 shows an example in which the method for manufacturing an optical fiber of the present invention is carried out based on the second embodiment using the apparatus illustrated in FIG. 3.

That is, a two-layer coating-structured silica glass-based optical fiber (with a diameter of the bare optical fiber of 125 μm and a finished outer diameter of the fiber of 250 μm) having the properties of an ordinary single-mode fiber was manufactured in the following manner. Only the surface layer of the bare optical fiber was melted while the bare optical fiber 16 drawn from the drawing furnace 14 was cooled in the cooling device 18A, in which He gas was used as the cooling gas. Subsequently, the surface layer was cooled in the re-cooling device 32A so as to be re-solidified. Further, a protective coating layer made of an ultraviolet-curable resin was formed, and the bare optical fiber was taken up by the take-up device 26 with a tensile force of approximately 100 gf. Here, the surface temperature of the bare optical fiber 16 was detected at the entrance of the reheating device 30 by the surface temperature detection device 34, and the flow amount of the cooling gas (He gas) in the cooling device 32A was controlled so that the surface temperature of the bare optical fiber 16 at that location reached down to 100° C. or 50° C. The take-up speed (drawing speed) was changed variously in a range of 100 m/min to 600 m/min.

As a result of investigating the residual stresses in the surface layer of the bare fiber portions after the release of the tensile force in the respective obtained optical fibers, it was confirmed that the residual compressive stress was almost uniformly imparted throughout the optical fiber in the longitudinal direction at all drawing speed and all temperatures (the surface temperature at the entrance of the reheating device 30). Typically, it was confirmed that, in a case in which the drawing speed was 600 m/min, and the surface temperature immediately before the reheating was 100° C., a residual compressive stress of approximately 55 MPa was almost uniformly imparted in the longitudinal direction in the surface layer of the bare fiber portion after the release of the tensile force.

In addition, it was confirmed that, when the optical fibers imparted with the residual compressive stress were actually bent, cracking or fracturing did not occur on the outside of the bent portions in all optical fibers up to the bend radius reached 2.0 mmφ.

Comparative Example 2

Similarly to Example 2, a two-layer coating-structured silica glass-based optical fiber (with a diameter of the bare optical fiber of 125 μm and a finished outer diameter of the fiber of 250 μm) having the properties of an ordinary single-mode fiber was manufactured in the following manner. Only the surface layer of the bare optical fiber was melted while the bare optical fiber 16 drawn from the drawing furnace 14 was cooled in the cooling device 18A. Subsequently, the surface layer was cooled in the re-cooling device 32A so as to be re-solidified. Further, a protective coating layer made of an ultraviolet-curable resin was formed, and the bare optical fiber was taken up by the take-up device 26 with a tensile force of approximately 100 gf. Here, the surface temperature of the bare optical fiber 16 was detected at the entrance of the reheating device 30 by the surface temperature detection device 34, and the flow amount of the cooling gas (He gas) in the cooling device 32A was controlled so that the surface temperature of the bare optical fiber 16 at that location reached 150° C. to 5000° C. In addition, the take-up speed (drawing speed) was changed variously in a range of 100 m/min to 1000 m/min.

As a result of investigating the residual stresses in the surface layer of the bare fiber portions after the release of the tensile force in the respective obtained optical fibers, it was confirmed that, in a case in which the surface temperature of the bare optical fiber 16 at the entrance of the reheating device 30 was 150° C., some areas were imparted with the residual compressive stress, and some other areas were not imparted with the residual compressive stress in the longitudinal direction of the optical fiber at all drawing speed. That is, it was determined that the presence of the residual compressive stress varied. In addition, it was confirmed that, in a case in which the surface temperature of the bare optical fiber 16 at the entrance of the reheating device 30 was 200° C. to 500° C., the residual compressive stress was not imparted to the optical fibers at all drawing speed.

In addition, it was confirmed that, when the optical fibers, in which the residual compressive stress was not imparted or the presence of the residual compressive stress varied in the longitudinal direction, were actually bent, fracturing occurred on the outside of the bent portions in all optical fibers if the optical fibers were bent up to a bend radius of 2.0 mmφ.

Figure 5:
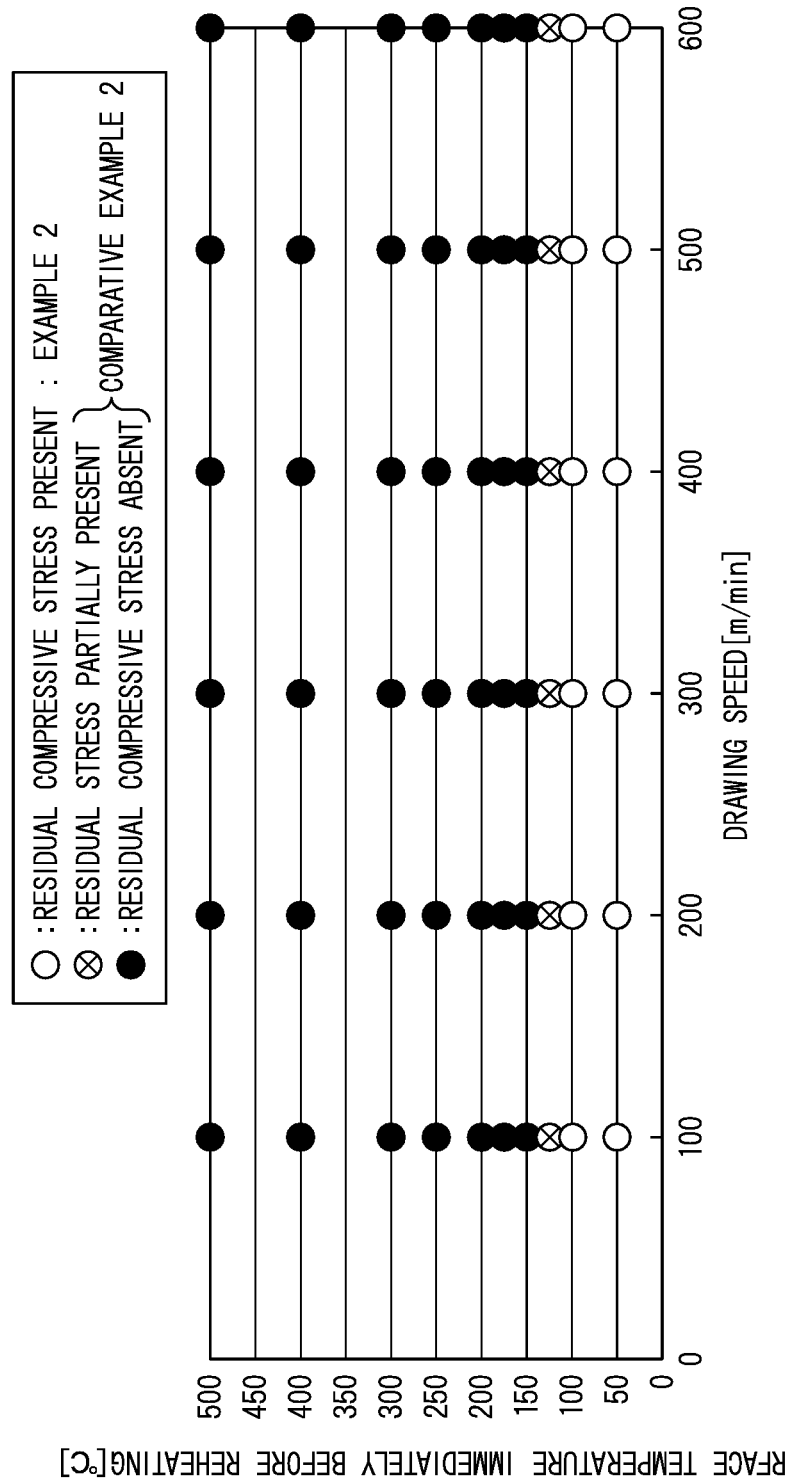
FIG. 5 illustrates graphs showing the results of the presence of the residual compressive stress of Example 2 of the present invention and Comparative example 2.
Figure 6:
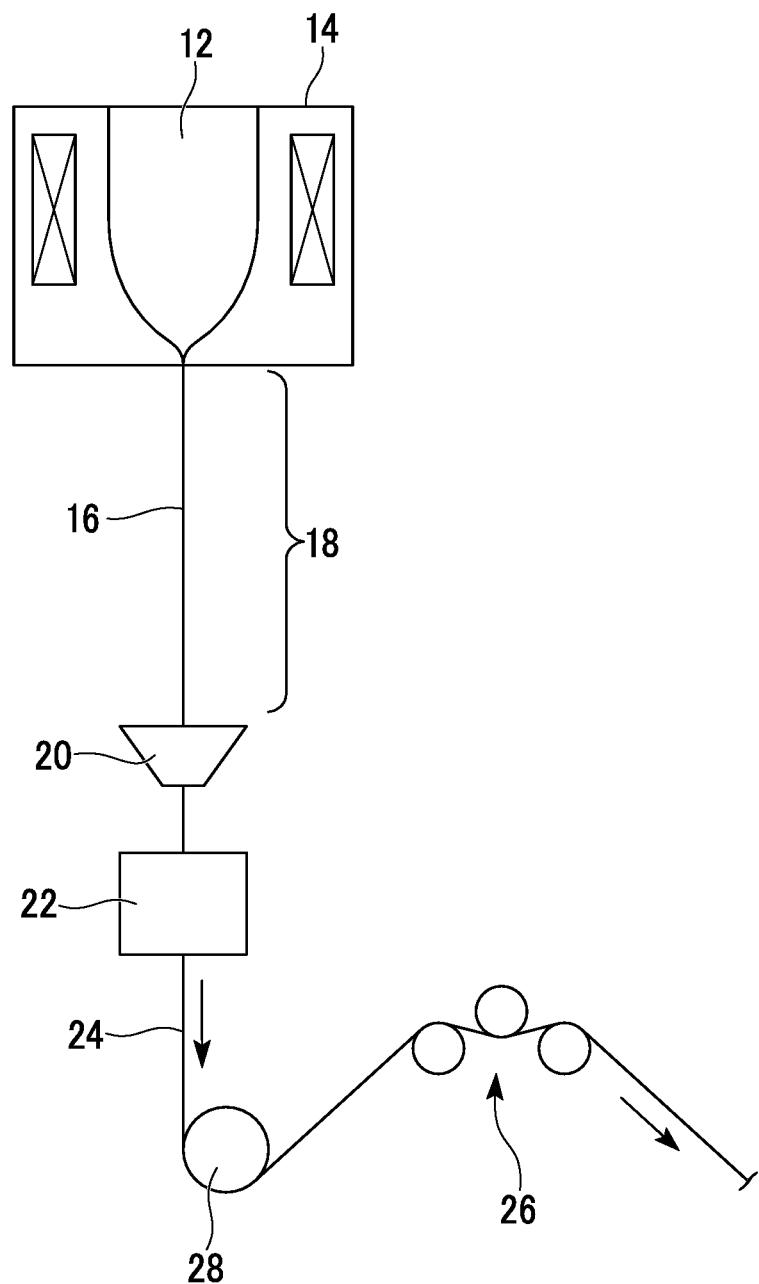
FIG. 6 is a schematic view illustrating an example of an apparatus for carrying out the method for manufacturing an optical fiber according to the related art.
Figure 7:
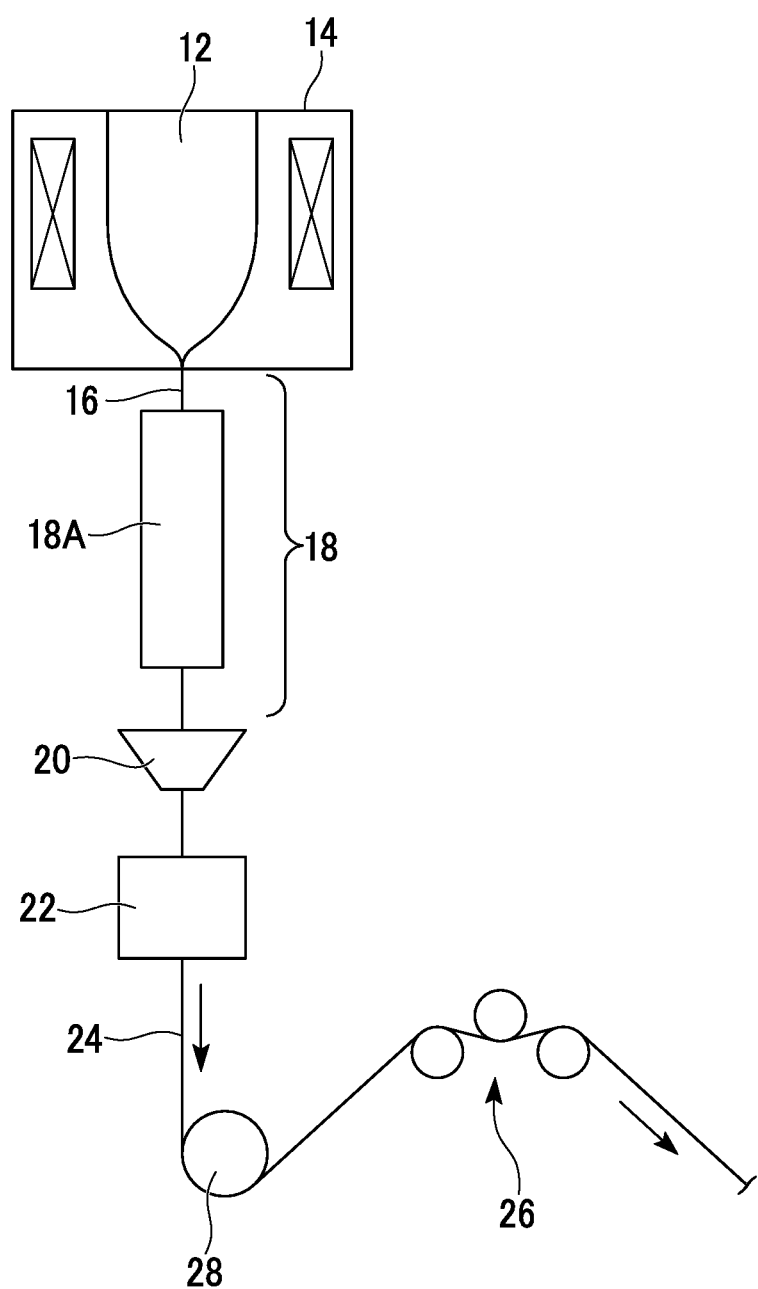
FIG. 7 is a schematic view illustrating another example of an apparatus for carrying out the method for manufacturing an optical fiber according to the related art.

The results of the presence of the residual compression after the release of the tensile force at the respective drawing speed and the respective cooling times, in the above Example 2 and Comparative example 2, are summarized in FIG. 5. It is evident from FIG. 5 that, when using the apparatus as illustrated in FIG. 3, if the surface temperature immediately before the reheating is controlled to be 100° C. or lower, the residual compressive stress can be stably imparted to the optical fibers which are manufactured at all drawing speed in a range of 100 m/min to 600 m/min after the release of the tensile force.

According to some aspects of the present invention, it is possible to provide a method and an apparatus for manufacturing an optical fiber in which a residual compressive stress is reliably and stably imparted to the surface layer of the bare optical fiber portion so that the bending resistance is reliably and stably excellent.

What is claimed is:
1. A method for manufacturing an optical fiber comprising:
heating and melting a silica-based optical fiber preform in a drawing furnace;
drawing the melted preform into a linear shape from the drawing furnace at a speed of approximately 5 m/min to 100 m/min, continuously cooling and solidifying the linear shape through cooling in an atmosphere to form a bare optical fiber;
coating the bare optical fiber with a resin to form an optical fiber; and continuously taking up the optical fiber while applying a tensile force using a take-up machine, wherein, when a surface temperature of the cooled and solidified bare optical fiber reached down to 100° C. or lower, a surface of the bare optical fiber is reheated while applying a tensile force so as to remelt only a surface layer of the bare optical fiber, a time period from when the melted preform is drawn from the drawing furnace to when the reheating begins is set to 2 seconds or more; and the surface layer of the bare optical fiber that has been remelted is re-solidified, then, the bare optical fiber is coated with a resin, and the tensile force is released afterward, thereby obtaining an optical fiber having a residual compressive stress imparted to the surface layer in the bare optical fiber.

2. A method for manufacturing an optical fiber comprising:

heating and melting a silica-based optical fiber preform in a drawing furnace;

drawing the melted preform into a linear shape from the drawing furnace at a speed of approximately 100 m/min to 1000 m/min, continuously cooling and solidifying the linear shape through a cooling device to form a bare optical fiber;

coating the bare optical fiber with a resin to form an optical fiber; and continuously taking up the optical fiber while applying a tensile force using a take-up machine, wherein, when a surface temperature of the cooled and solidified bare optical fiber drawn from the cooling device reached down to 100° C. or lower, a surface of the bare optical fiber is reheated while applying a tensile force so as to remelt only a surface layer of the bare optical fiber, and the surface layer of the bare optical fiber that has been remelted is re-solidified, then, the bare optical fiber is coated with a resin, and the tensile force is released afterward, thereby obtaining an optical fiber having a residual compressive stress imparted to the surface layer in the bare optical fiber.

3. The method for manufacturing an optical fiber according to claim 2, the method further comprising:

measuring the surface temperature of the cooled and solidified bare optical fiber using a surface temperature detection device; and controlling the cooling device using a cooling control device depending on the surface temperature detected by the surface temperature detection device.

\* \* \* \* \*